Oct. 10, 1933.  D. D. STONE  1,929,797
VIBRATION ELIMINATOR
Filed April 1, 1931
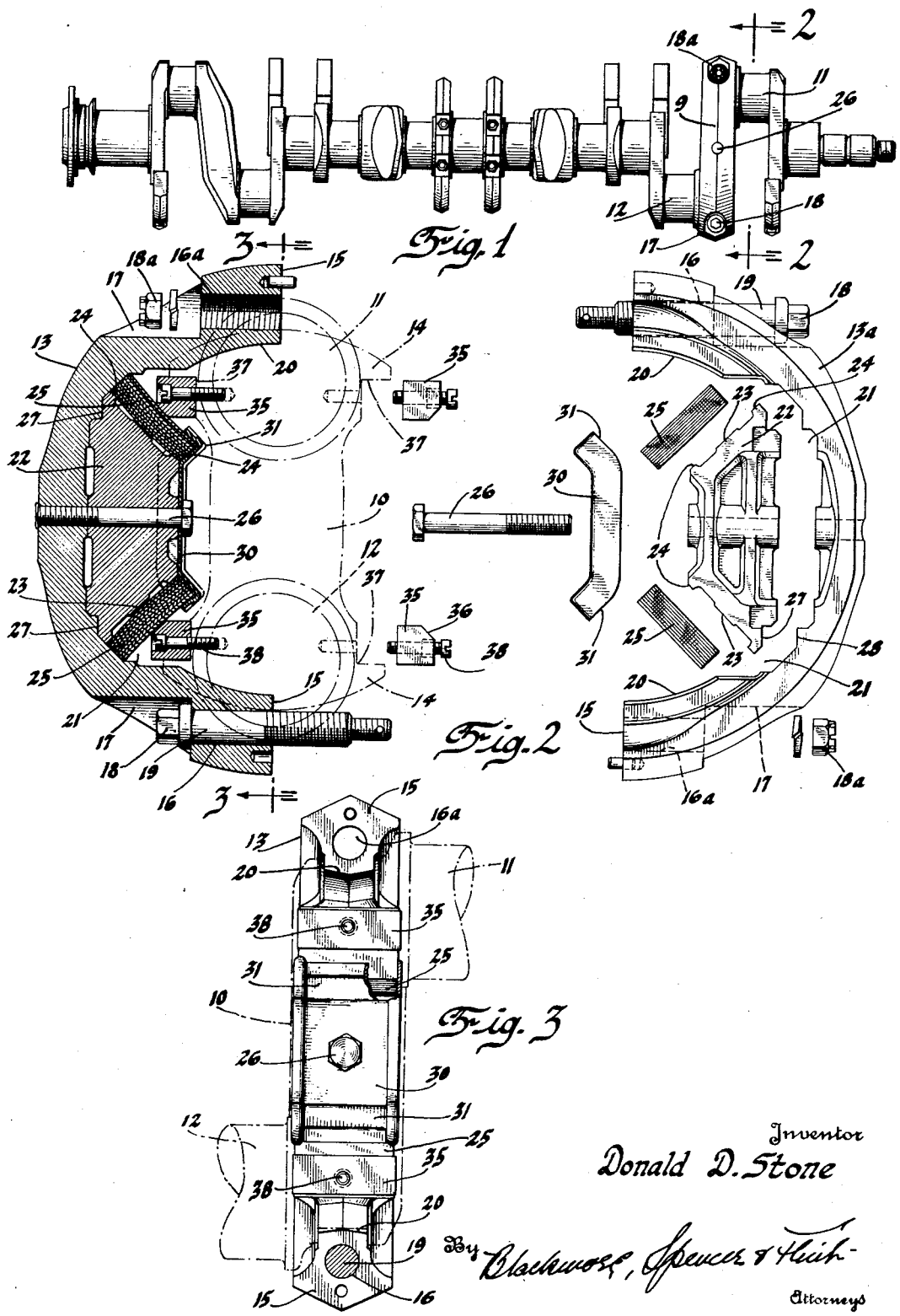
Inventor
Donald D. Stone
By Blackmore, Spencer & Hink
Attorneys Patented Oct. 10, 1933

1,929,797

UNITED STATES PATENT OFFICE 1,929,797

VIBRATION ELIMINATOR

Donald D. Stone, Flint, Mich., assignor to General Motors Corporation, Detroit, Mich., a corporation of Delaware Application April 1, 1931. Serial No. 526,897

4 Claims. (Cl. 74—6)

The invention herein disclosed and claimed relates to means for suppressing vibrations and particularly to balancers for dynamically suppressing torsional vibrations of engine, or other crankshafts, subjected to forces that tend to twist them periodically.

Torsional vibration balancers adapted to be mounted elastically on the crank shafts of internal combustion engines are well known and widely used. In this invention there is realized a torsional vibration balancer susceptible of being attached to a crank shaft already in balance without disturbing the balance thereof; which does not require any elongation of the shaft to provide for its reception; which may be mounted on the crank shaft within the housing between the fly wheel and the front bearing; which may be fabricated conveniently by mass production methods and readily assembled and disassembled without the use of special tools.

The invention consists, specifically, of the combination of a crank shaft with a ring like inertia mass journaled concentrically with respect to the shaft axis and surrounding a crank arm connecting two crank pins; said inertia mass comprising two semiannular sections each carrying a spring abutment body directed radially inward the opposite sides of which converge toward the center; means for holding a pair of springs attached respectively to opposite sides of said abutment body; and said crank arm carrying on opposite edges spaced abutments adapted to oppose the abutments on said semiannular section; whereby the ring-like inertia mass may oscillate at a given frequency about the crankshaft axis in response to torsional vibrations of the shaft.

In the accompanying drawing wherein like reference characters indicate like parts throughout the several views, Fig. 1 represents an engine crank shaft provided with a balancer constructed according to this invention;

Fig. 2 is a view of the balancer parts showing one half in section with its component parts assembled and the other half mainly in elevation with elements separated, and Fig. 3 is a sectional view on the line 3—3 of Fig. 2, viewed in the direction of the arrows.

The crank shaft shown in Fig. 1 is an eight-throw shaft now in use in a motor car having an engine with eight cylinders in tandem or "in line" arrangement. The front end of the crank shaft shown is at the right and the rear end at the left of this view. It will be understood that the usual fly wheel (not shown) is to be attached to the rear end of the shaft and that the usual engine accessories are to be driven by the front end thereof. As an engine crank shaft is elastic and the inertia of the flywheel tends to cause the shaft to rotate at even speed it will be apparent that the periodic forces due to the reciprocating pistons tend to twist the shaft periodically while the elasticity of the shaft tends to restore it to its normal condition between the thrusts of the pistons. When the periodic piston forces synchronize with the vibrations of the shaft, vibrating at its natural frequency, as is well known, vibrations of considerable amplitude occur, particularly at the front end of the shaft which drives the accessories, unless means for suppressing them are provided. It is not unusual, therefore, to apply vibration suppressing devices to the shaft adjacent the front end thereof. The crank pins of a multi-cylinder engine are usually designated numerically according to their positions from front to rear, the front pin being designated crank pin No. 1, the next one in order, proceeding rearward, No. 2 and so on. In the embodiment chosen for illustration, the balancer, indicated as a whole by numeral 9, is mounted concentrically of and balanced with respect to the shaft axis so as to oscillate in a plane normal thereto on oppositely disposed bearing surfaces formed at the opposite ends of the double crank arm 10 which connects No. 1 and No. 2 crank pins, indicated respectively by the numerals 11 and 12. Preferably the double crank arm 10 and balancer 9 are substantially of equal thickness measured longitudinally of the crank shaft axis.

The vibratory mass of the balancer is composed of two substantially equal ring like halves, 13 and 13a, meeting end to end to form a continuous balancer ring adapted to oscillate in bearings on the ends of the double crank arm 10. As shown by broken lines in Figs. 2 and 3 the double crank arm is integrally or otherwise rigidly connected at one end to the pin 11 and at the opposite end to the pin 12. Each end of said arm is grooved to form bearings and guides in which the balancer ring may oscillate in a plane normal to the crank shaft axis. The bottom and sides of said grooves are machined on circular lines concentric with the shaft axis, and the ends of the double crank arm may be expanded as shown to form two equal segments 14 with parallel chords as illustrated in Fig. 2 by broken lines, thus providing opposed spaces 15 between the segmental ends.

The two semi-annular halves or sections of the balancer ring are substantially alike and may be wrought or cast in the same die or mold, or formed by the same automatic production machine. Each half has its end surfaces 15 in one diametrical plane and is perforated through said end plane by parallel bolt holes, 16, 16a, the holes in one half registering with the holes in the other when said halves are assembled to form a complete ring. Cavities 17 are formed in each half on the convex side, said cavities being intersected by said bolt holes in order to provide countersinks for the bolt heads 18 and nuts 18a used with bolts 19 for fastening the two halves together. In the construction shown the bolt holes 16a are threaded to receive the threads of bolts 19 and the holes 16 are plain to receive the bolt shanks freely. The sections are therefore reversed when assembled and held together by the bolts 19 one of which engages the threaded hole in one section while the other engages the threaded hole in the other section. The nuts 18a are adapted to be locked to prevent unscrewing of said bolts.

The balancer ring composed of the two halves 13 and 13a is formed on the inner periphery with suitable curved bearing and guiding ribs or tongues 20, adjacent the meeting ends of said halves. These ribs or tongues ride in the bearing and guiding grooves previously described as formed in the ends of the double crank arm 10 and segments 14 integral with said arm. The ribs or tongues 20 and the bearing grooves may be of any suitable form in cross section, but each, of course, should correspond in cross sectional contour with the other. The said ribs or tongues correspond approximately in circumferential extent to the bearing and guiding grooves referred to. Between the ends of said ribs or tongues 20 the balancer ring is formed as if cut away interiorly to produce diametrically opposite spaces 21. Rigid with each balancer ring section is a spring abutment body 22 projecting radially inward from the inner side of the section within said spaces 21. The opposite sides 23 of said abutment bodies are inclined equally,—converging toward the shaft and balancer axis. Spaced-apart elevations 24 on the inclined sides of the abutment body constitute abutment-bearings for the ends of leaf springs 25 converging with respect to each other toward the axis like the sides of the abutment body 22. In the embodiment illustrated the abutment bodies 22 are manufactured as parts separate from the balancer ring sections and are bolted to the sections by bolts such as 26. In order to resist strains the body 22 is provided with rabbeted edges at 27, and the balancer sections with corresponding interfitting ledges 28 whereby the abutment body is shouldered to its seat. Excessive strain is thereby removed from the bolts and displacement guarded against. To retain the springs 25 on opposite sides of abutment body 22 prior to and while assembling the balancer sections on the shaft, and to prevent displacement of the springs during operation, a spring holder or clip 30 is secured to the inward end of the abutment body by the head of bolt 26. Ends 31 of the spring clip 30 project at each side and are cupped to receive the radially-inward ends of springs 25, thus retaining them in contact with the abutment bearings 24.

Abutment elements carried on the crank arm are shown at 35. These are preferably hard steel bars of a length approximately equal to the thickness of the crank arm 10 measured longitudinally of the shaft axis. Abutment bars 35 are preferably rectangular in section except as they may be machined away at 36, where springs 25 bear upon them, to avoid a sharp line contact therewith. The bars 35 are seated in rectangular notches 37 machined in the crank arms and secured by bolts 38. Bearing corners or surfaces 36 bear upon springs 25 at areas between the abutment bearings 24 and on the opposite side. When the balancer is assembled on the crank shaft the springs 25 should be loaded as represented in Fig. 2, which shows the springs bent or cambered by the pressure of the abutment bearings 24 carried by the balancer ring against the ends of the springs on one side, and the opposed pressure on the other side intermediate said bearings 24 of abutments 35 carried on the crank shaft. The loading pressures may be delicately adjusted by the use of shims.

The plates or leaves of the leaf springs 25 are illustrated as rectangular, having a width approximately equal to the thickness of the balancer ring measured longitudinally of the shaft axis. A sufficient number of these plates or leaves should be assembled in each spring to enable it, when properly adjusted as to initial load, to impart to the balancer assembly a natural frequency of vibration adapted to balance out the vibrations of the crankshaft vibrating at its natural frequency.

It will be understood that the spring abutments 22, springs 25 and spring clips 30, will be assembled on the balancer ring sections 13 and 13a prior to assembly of the balancer on the crank shaft. The balancer ring halves are then moved radially toward each other, moving the tongues or ribs 20 into the grooves on the ends of the double crank arm 10. In this movement the obliquely disposed leaf springs 25 enter readily between the abutments 35. The bolts 19 may then be inserted through the holes 16 in each section and screwed into the threaded holes 16a of the other section thus tightly binding the two sections together and bending the springs 25 to obtain the required preloading by the pressure of abutments 35 against them.

The construction shown and described is well adapted for quantity production. The crank shaft may be balanced before assembly therewith of the balancer, and as the balancer is mounted concentrically with respect to the shaft and is itself in static and dynamic balance, no further balancing operation is necessary after assemblage.

While in accordance with the law a preferred embodiment of the invention has been illustrated and described in specific terms in such manner as to enable others to make and use the invention, it is not intended that the protection sought shall be limited to the specific elements shown or that the terms of description shall be taken as terms of limitation, or that the scope of the invention shall be defined otherwise than by the appended claims.

I claim:

1. The combination of a shaft, a torsional vibration balancer ring journaled thereon concentric with the shaft axis, said balancer ring being composed of plural ring sections adapted to be assembled around the shaft; a pair of opposed leaf springs interposed between at least one section of the balancer ring and the shaft, said springs having their bearing surfaces converging inward toward the shaft axis, a wedge-like body on the balancer section extending radially inward, abutment bearings for the ends of the springs thereon, a spring retaining means secured to the balancer ring section and retaining said springs against the abutment bearings on said section, and abutments on the shaft bearing upon the sides of the springs opposite the sides which are in contact with the wedge-like body between the abutment bearings on the latter.

2. A combination as defined in claim 1 in which the balancer ring is composed of two similar semi-annular sections provided with bolt holes and screw bolts adapted to draw and secure the sections together.

3. The combination of a crank shaft having plural crank pins, a double crank arm connecting two longitudinally adjacent pins, coaxial curved bearings on the ends of said arm, a torsional vibration balancer ring journaled on said bearings, said balancer ring composed of two similar sections united substantially in a diametrical plane bisecting the crank arm longitudinally of said arm and shaft, a pair of leaf springs secured to each section, said springs converging inward toward the shaft axis, and abutment elements, carried on each side of said crank arm, bearing upon said springs.

4. A combination as defined in claim 3 in which each balancer ring section is provided with an abutment body having sides converging inward toward the shaft axis, spaced abutment bearings on each side of said body, means on the ring section for retaining the springs in contact with said abutment bearings, and abutment elements on the sides of the crank arm bearing upon the springs midway between the abutment bearings on said body attached to the ring and on the opposite sides of the springs.

DONALD D. STONE.